United States Patent
Maass et al.

(10) Patent No.: US 7,292,920 B2
(45) Date of Patent: Nov. 6, 2007

(54) METHOD AND DEVICE FOR LATERAL GUIDANCE OF A VEHICLE

(75) Inventors: Alexander Maass, Leonberg (DE); Klaus-Guenther Fleischer, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 643 days.

(21) Appl. No.: 10/801,344

(22) Filed: Mar. 15, 2004

(65) Prior Publication Data
US 2004/0249535 A1 Dec. 9, 2004

(30) Foreign Application Priority Data
Mar. 14, 2003 (DE) ................................ 103 11 241

(51) Int. Cl.
*B60Q 1/00* (2006.01)
*G08G 1/123* (2006.01)
*G06F 19/00* (2006.01)

(52) U.S. Cl. ..................... 701/41; 701/117; 701/300; 340/346; 340/903; 180/170

(58) Field of Classification Search .................. 701/41, 701/300, 301, 117; 340/901, 903, 425.5, 340/691.1, 346; 348/148, 54, 143; 180/169, 180/170
See application file for complete search history.

(56) References Cited

U.S. PATENT DOCUMENTS

| 6,057,754 A * | 5/2000 | Kinoshita et al. ........... 340/435 |
| 6,489,887 B2 * | 12/2002 | Satoh et al. ................. 340/436 |
| 2002/0087255 A1 * | 7/2002 | Jindo et al. .................... 701/96 |
| 2002/0126002 A1 * | 9/2002 | Patchell ....................... 340/436 |
| 2003/0168271 A1 * | 9/2003 | Massen ....................... 180/167 |

FOREIGN PATENT DOCUMENTS
DE 101 14 470 9/2002

* cited by examiner

*Primary Examiner*—Tan Q. Nguyen
(74) *Attorney, Agent, or Firm*—Kenyon & Kenyon LLP

(57) ABSTRACT

The present invention relates to a method and a device for the lateral guidance of a vehicle. A warning device that outputs a warning signal when straying from a traffic lane is able to be turned off by a switching means when driving on a road that is not suitable for lateral guidance, in particular an inner-city road, and be turned on again when reaching a road that is suitable for lateral guidance.

15 Claims, 4 Drawing Sheets

METHOD AND DEVICE FOR LATERAL GUIDANCE OF A VEHICLE

BACKGROUND INFORMATION

From German Patent Application No. DE 101 14 470, a tracking and vehicle speed control device for motor vehicles is known by which the course of the traffic lane and the position of a vehicle relative to the traffic lane it is driving in are ascertained with the aid of video-based lane detection. Signals derived from the course of the traffic lane and the position of the vehicle are transmitted to a warning device, which outputs an acoustic warning signal, for example, so as to alert the driver of an imminent undesired lane change. Such a video-based lane detection often yields unsatisfactory results in detecting the road course, especially in the case of roads with sharp bends. Much too often this is accompanied by false warnings of the warning device, which alert the driver of a lane change allegedly taking place. As soon as the driver becomes aware of these unfounded error alerts, the warnings tend to be disregard and overridden. The acceptance of this assistance system, which was actually meant to make driving less complicated for the driver, ultimately suffers. The cause of frequent false alerts may be roads that are not designed for such an assistance system and thus overtax it. Frequent errors in the lane detection must be expected, for instance, in the case of roads that have a radius of curvature of less than 100 m. This situation is often encountered on inner-city streets and also on entrance and exit ramps of expressways and highways. Furthermore, especially in inner cities, lane demarcations are disregarded by drivers and sometimes even intentionally ignored, for example, when trying to keep the greatest possible lateral distance from obstacles appearing along the edge of the road or with respect to other persons driving in too unsafe a manner, such as bicyclists. In such situations the emitting of a warning signal alerting the driver to a lane change tends to be undesired since it interrupts the driver and distracts him from the traffic situation.

SUMMARY OF THE INVENTION

The present invention is based on the recognition that a generally useful support system for the driver, in this case, a warning system that, as part of a lateral guidance system, warns the driver before leaving a traffic lane, is not always able to fulfill its intended function in a useful manner in special situations and will thus more likely be conceived as distracting. By careful analysis of the course of a road on which a vehicle is traveling, it is determined whether this road is suitable for automatic lane detection in the first place and also for triggering a warning device when leaving a traffic lane. If this is not the case, the warning device will be turned off, at least temporarily. This suppresses false alarms and the driver is not inconvenienced unnecessarily. The warning is reactivated only once it has been established that a lane course suitable for automatic tracking is available again. Overall, this leads the driver to put more trust in the warning device. In an especially advantageous exemplary embodiment of the present invention, the design approach of the present invention is realized merely with the aid of the means for lateral guidance already present in the vehicle. In further exemplary embodiments of the present invention, information from satellite-supported navigation systems or video systems is utilized in addition. In an advantageous further development of the present invention, the means provided for turning the warning device off and information are utilized for the automatic activation of additional comfort functions of the vehicle. For example, a speed controller may automatically be set to the maximum speed allowed in city traffic.

DETAILED DESCRIPTION

Figure 1:
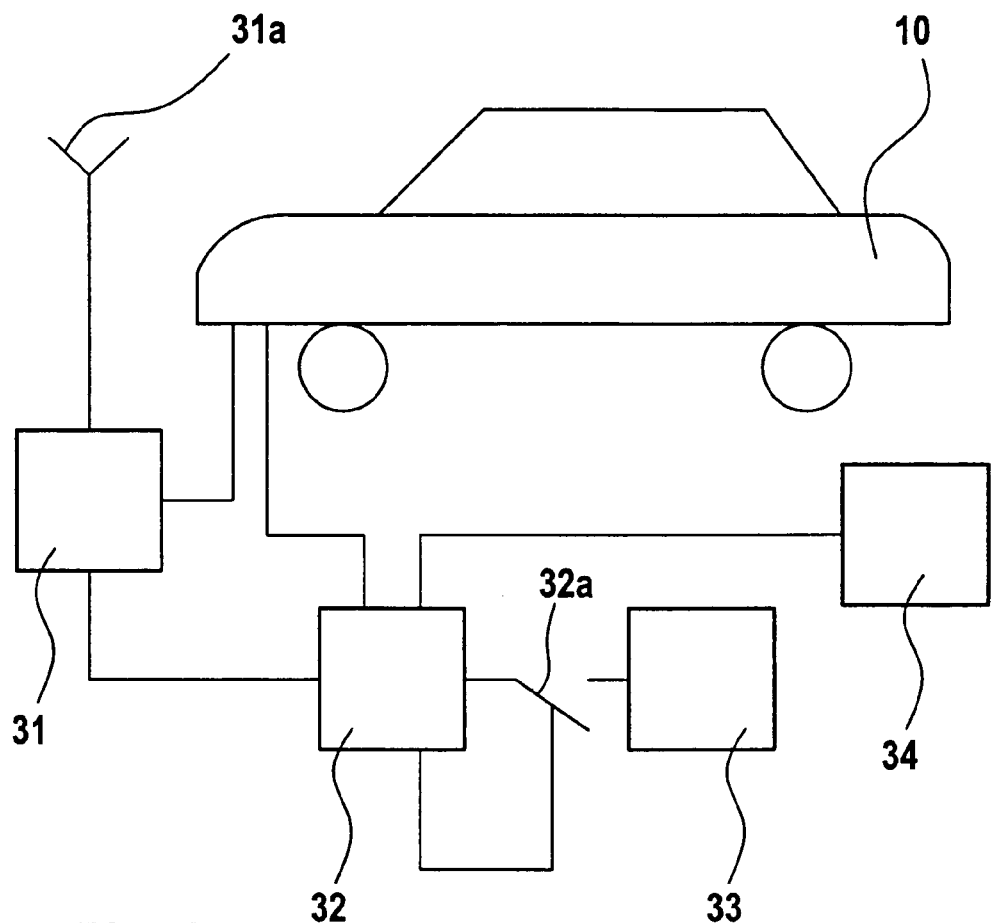
FIG. 1 shows a block diagram of a device for the lateral guidance of a vehicle.

FIG. 1 shows a block diagram of a device for the lateral guidance of a vehicle 10. The device arranged in vehicle 10 includes a lateral guidance device 32, which is connected to a panoramic-vision device, such as a video device 34, in particular, a navigation system 31, and a warning device 33. The navigation system is equipped with an antenna 31a via which it receives signals from satellites of the G.P.S. system. Video device 34, which may additionally be supported by a radar system (not shown here), records images of the environment of vehicle 10. Specifically, the video device also detects lane markings or other traffic-lane demarcations and transmits corresponding signals to lateral guidance device 32, which utilizes them for the lateral guidance of vehicle 10. To make the lateral guidance possible, the lateral guidance device may intervene in the steering of vehicle 10. A switching means 32a, which is able to be actuated by lateral guidance device 32, is arranged in front of warning device 33. Warning device 33 may be turned off and on with the aid of this switching means 32.

Figure 2:
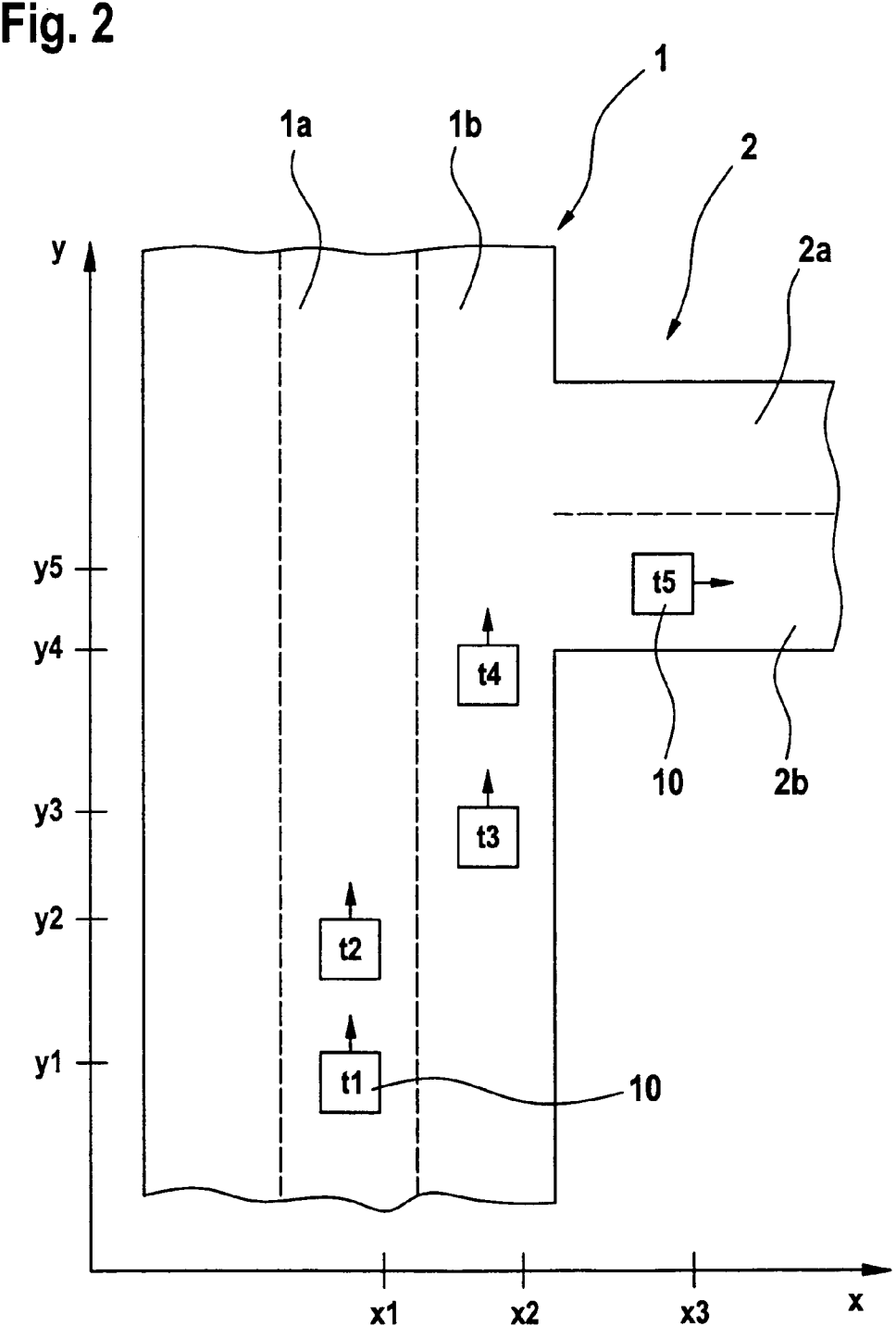
FIG. 2 shows the schematic representation of a traffic situation.
Figure 3:
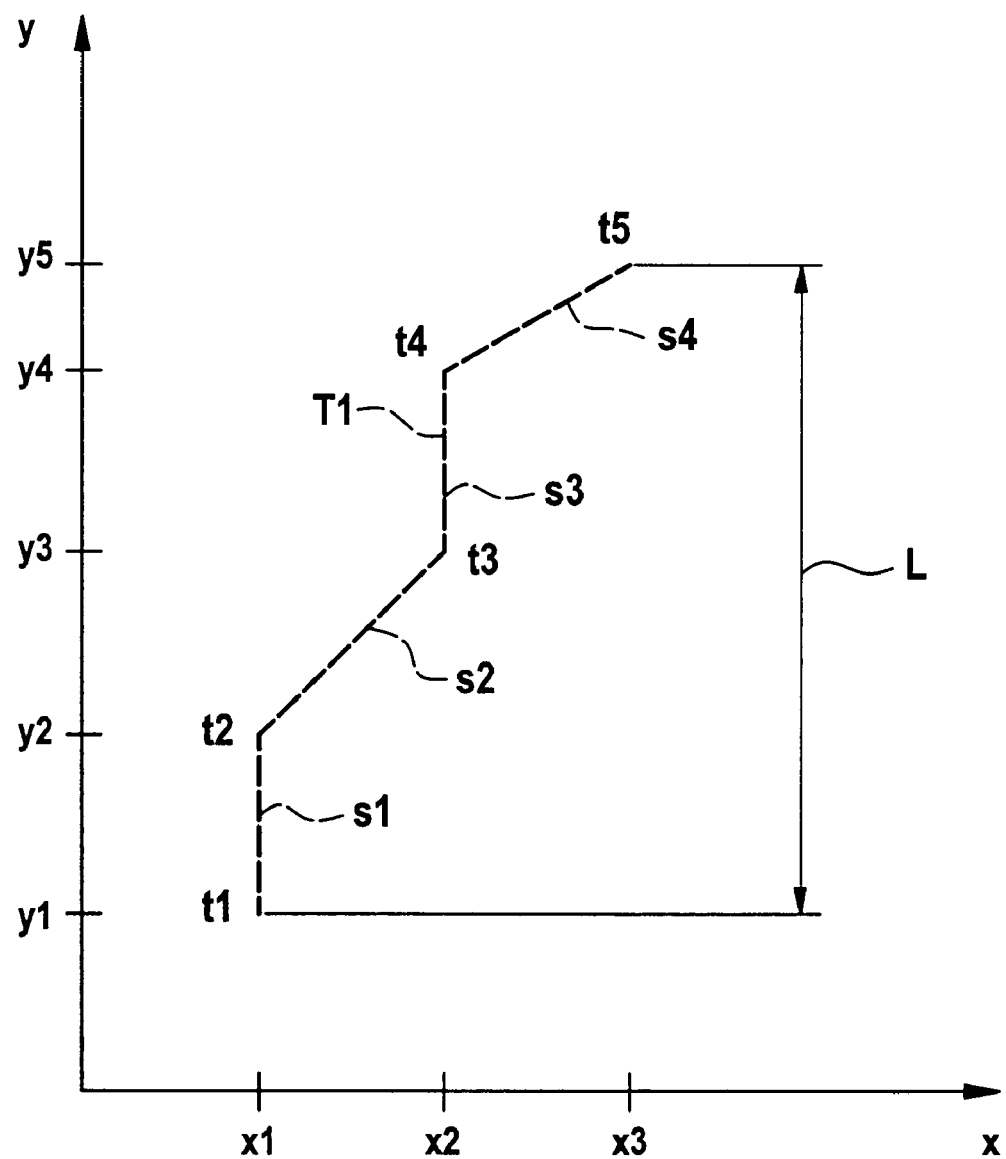
FIG. 3 shows, in a diagram, the representation of a track curve of a vehicle.

FIG. 2 shows a schematic representation of a traffic situation. A road 1 and a road 2, which branches off from it at a right angle, are located in a coordinate system defined by an x-axis and a y-axis. Both roads 1 and 2 have a plurality of traffic lanes 1a, 1b, . . . and 2a, 2b, respectively. A vehicle 10 is moving along previously mentioned roads 1, 2. At first, vehicle 10 drives in an inner lane 1a of road 1, then changes to lane 1b of the road and finally turns into road 2. At particular instants t, vehicle 10 is at certain positions that are defined by their spatial coordinates x, y. For example, at instant t1, vehicle 10 is in the position defined by spatial coordinates x1, y1. At instant t2, the vehicle has reached the position defined by spatial coordinates x2, y2, etc. The segments s1, s2 . . . lying between the individual positions of vehicle 10 form a track curve T1, as shown in FIG. 3, which extends over a length L when viewed in the direction of the y-axis. The data, such as, in particular, the vehicle speed, the yaw-angle rate and the steering angle, which are provided by a multitude of sensors via the vehicle-side data bus, specifically the CAN bus, characterize the instantaneous moving state of vehicle 10. By integrating the data over time over a predefined measuring period, the particular position change of vehicle 10 is obtained. A useful time interval is 40 ms, for instance. The position changes of vehicle 10, detected over several measuring periods, are linked to form a track curve T1, as previously described.

Figure 4:
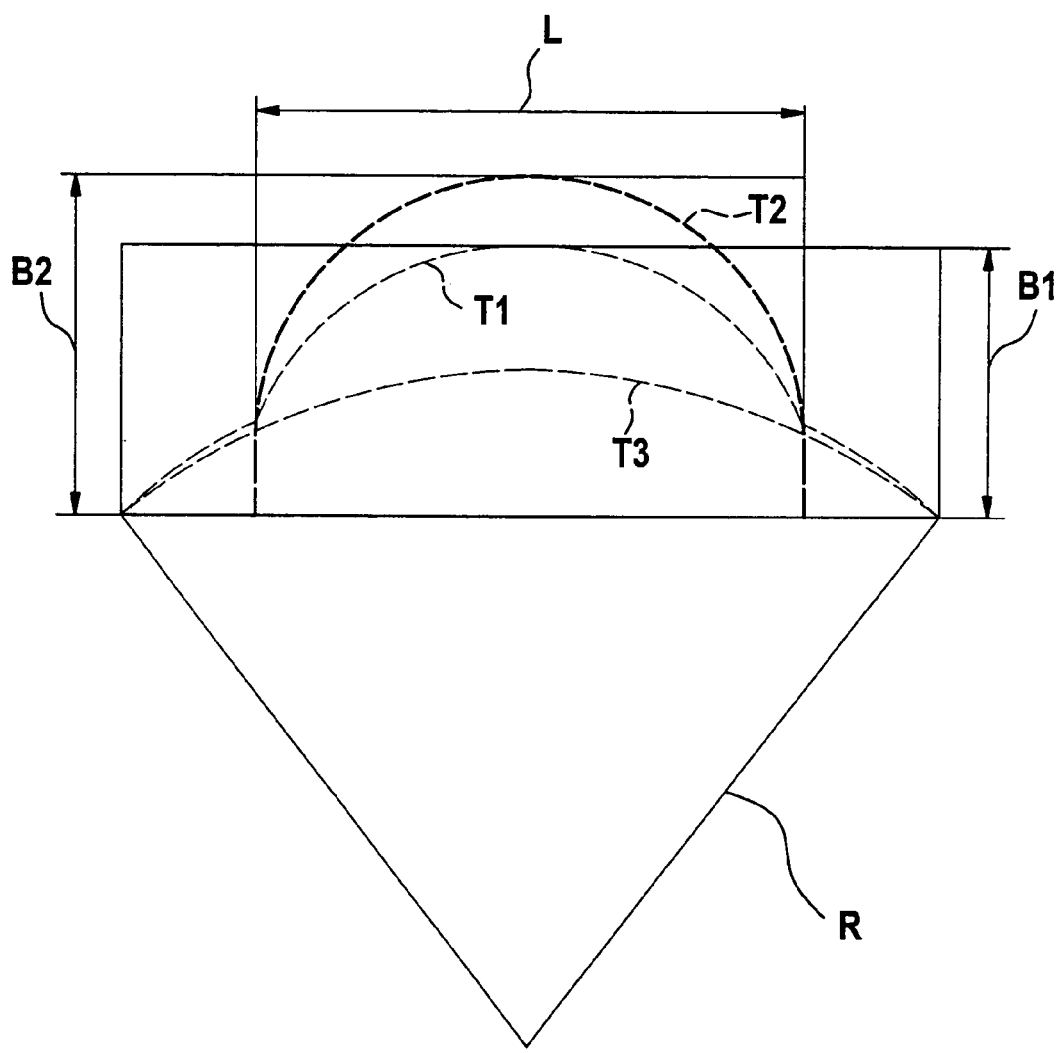
FIG. 4 shows, in a diagram, the comparison of different track curves of a vehicle.

In the exemplary embodiment described, it is useful to view the final 90 m of track curve T1 in each case, that is to say, segment s1, for example, that has been traveled between instants t1 and t2. According to FIG. 4, the spatial extension of track curve T1 recorded in this manner is determined by calculating the lateral lengths of a rectangle enclosing track curve T1. In the diagram shown in FIG. 4 this rectangle has length L and width B. Of interest in this context is especially width B of the rectangle since it provides information concerning the course of roads 1, 2 on which vehicle 10 is traveling. To determine the rectangle, a regression line, defined by support points of the track curve, is first determined. The direction of this line determines the main dispersion direction of the support point quantity. The width of the rectangle results from the minimum and the maximum value of the perpendicular distances, bearing mathematical signs, between support points and the regression line. Width B of the rectangle determined in this manner is compared to a preselected threshold value B1. On the basis of this comparison it is then determined whether track curve T corresponds to a road that satisfies the established minimum requirements with respect to road geometry.

A two-lane road having a minimum curve radius R of approximately 100 m on which a lane change is allowed, too, is used as reference in determining a useful threshold value B1. Driving on such a road that allows a lane change leads to a track curve T1, utilized as reference, whose width results from the sum of the width of the circular arc, given a circular-arc length L of approximately 90 m, a radius R of 100 m and a lane width of 4 m. Track curves T2, actually driven by vehicle 10, are then taken as an indication of a road course that no longer satisfies the minimum requirements for lane detection in those cases where width B2 of the actually driven track curve T2 exceeds that of track curve T1 provided as reference. If the previously defined threshold value B1 for a still allowed width of the track curve is exceeded by actually traveled track curve T2, this will lead to warning device 33 to be turned off or muted via activation of switching means 32a.

In order to again provide the advantages of an active warning device 33 at the earliest possible time, a useful criterion is provided for turning warning device 33 on again or to reactivate it. For example, warning device 33 is preferably switched to active again when vehicle 10 has covered at least a segment s1, s2, of 1 km and, in doing so, has driven a track curve T1, T3 whose width B has remained below established threshold value B1. As an alternative, it is also possible to stipulate that a minimum value of the speed must first be reached again. For example, warning device 33 may be switched to active again as soon as the speed of vehicle 10 exceeds the limit of 80 km/h. Both criteria are suitable as an indication that vehicle 10 is once again traveling on a road segment that allows automatic lateral guidance. Under these circumstances, it is then also useful to reactivate warning device 33. Instead of a relatively simple classification of track curves T1, T2, T3 by means of a rectangle enclosing the track curves, in an advantageous additional development of the present invention it is also possible to adapt parameterized curves of a higher order to the track curves. For examples, parabolas or partial areas of klothoids could be used for this purpose in order to obtain more precise information concerning the type of road on which the vehicle is traveling and also of driving maneuvers executed by vehicle 10.

In an advantageous further development of the present invention, a navigation system may be used in addition. The vehicle position determined via the G.P.S. system is checked by alignment with a digital road map, so as to ascertain whether the position is within an urban area where it is advisable to turn the warning device off.

In another exemplary embodiment of the present invention, images of the vehicle environment are recorded by cameras. If the evaluation of the video signals provides an indication that the vehicle has entered an urban area, for example by showing heavily developed terrain or traffic signs indicating the entrance to a town, warning device 33 will be turned off.

In another advantageous embodiment of the present invention, additional comfort and safety functions, which facilitate the steering of a vehicle 10 in inner-city regions, may be turned on simultaneously with warning device 33 being turned off. For example, the speed controller may be set thus that the maximum speed of 50 km/h allowed within city limits is not exceeded. Furthermore, a system for detecting pedestrians, means for detecting pedestrian crossings or also a system for measuring parking spaces may be turned on. If the high beam has previously been activated in vehicle 10, it is conveniently changed to low beam. It is now also possible to utilize lane markings applied on traffic lanes 1a, 1b, 2a, 2b, in addition.

What is claimed is:

1. A method for a lateral guidance of a vehicle, the vehicle including a lane detection device, the lane detection device including a warning device for alerting a driver of the vehicle when straying from a traffic lane, the method comprising:
   when driving on roads that are not suitable for lateral guidance, automatically turning off the warning device; and
   turning the warning device back on automatically when roads are reached once more that are suitable for lateral guidance.

2. The method according to claim 1, wherein the roads that are not suitable for lateral guidance are inner-city streets.

3. The method according to claim 1, wherein the warning device is turned on again when the vehicle exceeds a preselected minimum speed after the warning device has previously been turned off.

4. The method according to claim 1, wherein the warning device is turned on again after a minimum speed of about 60 km/h has been reached.

5. The method according to claim 1, further comprising detecting position changes of the vehicle at intervals of multiple 10 ms.

6. The method according to claim 1, further comprising detecting position changes of the vehicle at intervals of 40 ms.

7. The method according to claim 1, further comprising turning on at least one of additional comfort and safety functions of the vehicle when the warning device is turned off.

8. The method according to claim 1, further comprising, when the warning device is turned off, setting a device for regulating a speed of the vehicle, present in the vehicle, to a preselected setpoint speed.

9. A method for a lateral guidance of a vehicle, the vehicle including a lane detection device, the lane detection device including a warning device for alerting a driver of the vehicle when straying from a traffic lane, the method comprising:
   when driving on roads that are not suitable for lateral guidance, turning off the warning device;
   turning the warning device back on when roads are reached once more that are suitable for lateral guidance;

determining a track curve traveled by the vehicle over a certain distance;

determining a width of the track curve and comparing the width to a preselected value for the width; and turning off the warning device when the preselected value for the width of the track curve has been exceeded.

10. The method according to claim 9, wherein the preselected value is a limit value.

11. The method according to claim 9, wherein the preselected value is a threshold value.

12. A method for a lateral guidance of a vehicle, the vehicle including a lane detection device, the lane detection device including a warning device for alerting a driver of the vehicle when straying from a traffic lane, the method comprising:

when driving on roads that are not suitable for lateral guidance, turning off the warning device;

turning the warning device back on when roads are reached once more that are suitable for lateral guidance; and to determine a track curve of the vehicle, ascertaining position changes of the vehicle at preselected instants and linking drive segments lying between determined positions to form a track curve of the vehicle.

13. A method for a lateral guidance of a vehicle, the vehicle including a lane detection device, the lane detection device including a warning device for alerting a driver of the vehicle when straying from a traffic lane, the method comprising:

when driving on roads that are not suitable for lateral guidance, turning off the warning device;

turning the warning device back on when roads are reached once more that are suitable for lateral guidance; and setting a light system of the vehicle to a low beam when the warning device is turned off.

14. A device for a lateral guidance of a vehicle, the vehicle including means for providing lateral guidance which includes a warning device to alert a driver of the vehicle when straying from a traffic lane, the device comprising:

a switching arrangement for automatically turning the warning device off when driving on roads that are unsuitable for lateral guidance, and for automatically turning the warning device on again when roads that are suitable for lateral guidance are reached once again.

15. The device according to claim 14, wherein the roads that are unsuitable for lateral guidance are inner-city roads.

* * * * *